US012811524B2

(12) United States Patent
Stahl et al.

(10) Patent No.: US 12,811,524 B2
(45) Date of Patent: Nov. 24, 2026

(54) DRIVE SYSTEM

(71) Applicant: SEW-EURODRIVE GMBH & CO. KG, Bruchsal (DE)

(72) Inventors: Alexander Stahl, Karlsruhe (DE); Carsten Ackermann, Karlsruhe (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 209 days.

(21) Appl. No.: 18/839,256

(22) PCT Filed: Jan. 25, 2023

(86) PCT No.: PCT/EP2023/051820
§ 371 (c)(1),
(2) Date: Aug. 16, 2024

(87) PCT Pub. No.: WO2023/156159
PCT Pub. Date: Aug. 24, 2023

(65) Prior Publication Data

US 2025/0167702 A1 May 22, 2025

(30) Foreign Application Priority Data

Feb. 16, 2022 (DE) ......................... 102022000592.1

(51) Int. Cl.
*H02P 21/16* (2016.01)
*F16D 59/00* (2006.01)
(Continued)

(52) U.S. Cl.
CPC .............. *H02P 21/16* (2016.02); *H02P 21/28* (2016.02); *H02P 21/36* (2016.02); *F16D 59/00* (2013.01); *F16D 2121/22* (2013.01)

(58) Field of Classification Search
CPC .......... H02P 21/16; H02P 21/28; H02P 21/36; H02P 21/00; F16D 59/00; F16D 2121/22
(Continued)

(56) References Cited

U.S. PATENT DOCUMENTS 6,329,772 B1 12/2001 Ochiai
6,621,291 B2 * 9/2003 Lee ...................... G01R 31/346 324/765.01

(Continued)

FOREIGN PATENT DOCUMENTS

DE 19908045 A1 9/2000
DE 10041788 A1 4/2004

(Continued)

OTHER PUBLICATIONS

International Report on Patentability issued in corresponding International Application No. PCT/EP2023/051820, dated Aug. 20, 2024, pp. 1-8, English Translation.

(Continued)

*Primary Examiner* — David Luo
(74) *Attorney, Agent, or Firm* — Carter, DeLuca & Farrell LLP

(57) ABSTRACT

A drive system includes an electric motor and a converter that feeds the electric motor. A cable electrically connects the electric motor to the converter and has first electrical lines, a second electrical line, and third electrical lines. A voltage detection device arranged on the first cable end detects a voltage present between the second electrical line and a further electrical line, e.g., a measuring line. The further electrical line is one of the first electrical lines or one of the third electrical lines, and the further electrical line is electrically connected to the second electrical line on the second cable end. The current flowing through the further electrical line is detected by a current detection device, and
(Continued)

a resistance value is determined from the detected voltage and the detected current and is provided to a control unit of the converter.

18 Claims, 3 Drawing Sheets

(51) Int. Cl.
*F16D 121/22* (2012.01)
*H02P 21/28* (2016.01)
*H02P 21/36* (2016.01)

(58) Field of Classification Search
USPC ................................ 318/400.02, 400.01, 700
See application file for complete search history.

(56) References Cited

U.S. PATENT DOCUMENTS

| | | | | |
|---|---|---|---|---|
| 8,384,338 | B2 * | 2/2013 | Lu | H02P 21/16<br>702/183 |
| 8,841,876 | B2 * | 9/2014 | Leaver | H02P 6/15<br>318/807 |
| 10,035,607 | B2 | 7/2018 | Wangemann | |
| 10,483,818 | B2 * | 11/2019 | Oya | H01F 5/00 |
| 10,601,349 | B2 * | 3/2020 | Wangemann | H02M 7/5395 |
| 10,819,264 | B1 | 10/2020 | Bojoi | |
| 11,283,383 | B2 | 3/2022 | Nemeth-Csoka | |
| 2010/0194329 | A1 | 8/2010 | Lu | |
| 2018/0156217 | A1 | 6/2018 | Sakima | |

FOREIGN PATENT DOCUMENTS

| | | | |
|---|---|---|---|
| DE | 102011014753 | A1 | 9/2012 |
| DE | 102011100361 | A1 | 11/2012 |
| DE | 102013006730 | A1 | 10/2014 |
| DE | 102013011352 | A1 | 12/2014 |
| DE | 102015005939 | B3 | 8/2016 |
| DE | 102016008014 | A1 | 1/2018 |
| DE | 112016002587 | T5 | 5/2018 |
| DE | 102018000509 | A1 | 8/2018 |
| DE | 102018004654 | A1 | 1/2019 |
| DE | 102018007551 | A1 | 3/2020 |
| DE | 102019218939 | A1 | 6/2021 |
| DE | 102021119845 | A1 | 2/2022 |
| EP | 3213952 | A1 | 9/2017 |
| EP | 3462600 | A1 | 4/2019 |

OTHER PUBLICATIONS

International Search Report and Written Opinion issued in corresponding International Application No. PCT/EP2023/051820 dated Apr. 4, 2023, pp. 1-10, English Translation.

Wikipedia "Vierleitermessung" https://de.wikipedia.org/wiki/Vierleitermessung, pp. 1-8, accessed on Oct. 13, 2022, with English Translation.

* cited by examiner

DRIVE SYSTEM

FIELD OF THE INVENTION

The present invention relates to a drive system.

BACKGROUND INFORMATION

In certain conventional systems, a drive system has an electric motor.

A drive system is described in U.S. Patent Application Publication No. 2010/0194329.

A method for operating a drive system is described in German Patent Document No. 10 2011 014 753.

A cable system is described in German Patent Document No. 199 08 045.

A drive system having a hybrid cable is described in German Patent Document No. 10 2011 100 361.

SUMMARY

Example embodiments of the present invention provide a drive system.

According to example embodiments of the present invention, a drive system includes an electric motor and a converter that feeds the electric motor. A cable, e.g., a hybrid cable, electrically connects the electric motor to the converter, and the cable includes first electrical lines, a second electrical line, and third electrical lines. A voltage detection device arranged on the first cable end detects a voltage present between the second electrical line and a further electrical line, e.g., a measuring line, in which the further electrical line is one of the first electrical lines or one of the third electrical lines. The further electrical line is electrically connected, e.g., directly connected, to the second electrical line on the second, e.g., the further, cable end. The current flowing through the further electrical line is detected by a current detection device, and a resistance value is determined from the detected voltage and the detected current and is provided to a control unit of the converter, e.g., for use in a stator flux-oriented control of the electric motor.

Thus, the drop in voltage on a measuring line can be determined via the second line. This is because by determining the voltage that has dropped on the measuring line and the current flowing through the measuring line, it is possible to determine the cable resistance to be assigned to the cable connecting the converter to the electric motor. When controlling the electric motor, improved control can be obtained by regularly updating the cable resistance. The control quality can be improved by this. It is not necessary for the measuring line itself to carry the motor current, but instead it is also possible for the measuring line to carry a further current that is detected, for example, the current supplied to a brake. However, the measuring line is connected in a heat conducting manner to the line carrying the motor current such that the temperature of the measuring line is equal to the temperature of the line carrying the motor current, e.g., in the framework of a permissible deviation.

According to example embodiments, each of the first electrical lines has the same line cross-section. Thus, the first electrical lines supply a brake or can be arranged as sensor lines.

According to example embodiments, each of the third electrical lines has the same line cross-section. Thus, the third electrical lines carry the motor current, e.g., are thus high current lines.

According to example embodiments, the second electrical line has the same line cross-section as the third electrical lines. Thus, the second line requires only a small amount of installation space in the cable. In addition, the cable can be used in various configurations, e.g., with a motor-side controller for the brake, so that only one supply to the control unit via the third electrical lines is necessary, or with a converter-side controller that supplies the brake via the third electrical lines, so that a split coil of the brake with central tap can be controlled by the controller.

According to example embodiments, the first electrical lines, the third electrical lines, and the second electrical line are connected to one another in a heat conducting manner. For example, the thermal transfer resistance between these lines is lower than the thermal transfer resistance from one of these lines to the environment. Thus, the cable resistance can also be determined indirectly in that the ohmic resistance of a third electrical line is determined and the cable resistance of the first electrical lines is extrapolated therefrom. This makes possible, for example, conversion of the resistances via the ratios of the line cross-sections. This is because all lines are arranged as copper wire lines. For example, the electrical lines are distinguished only by their cable resistances.

According to example embodiments, the first cable end is arranged on the converter side and the second cable end is arranged on the motor side, e.g., the voltage detection device and the current detection device are arranged in the converter. Thus, the cable can be used in both directions. If the voltage is detected on the converter side, voltage detection can be integrated in the electronics of the converter and data transmission of measured values detected at the other cable end is not necessary.

According to example embodiments, the first cable end is arranged on the motor side and the second cable end is arranged on the converter side, e.g., the voltage detection device and the current detection device are arranged on the electric motor or on a brake of the electric motor, e.g., in a controller. Thus, current detection and also voltage detection do not have to be carried out on a first electrical line that has a current driven by a pulse-width modulated voltage, but rather detection can be carried out on a measuring line that has a sinusoidal current.

According to example embodiments, the first electrical lines, the second electrical line, and the third electrical lines are each arranged as copper wires lines. Thus, different line cross-sections can be used and the voltage detection and current detection on a measuring line with the resulting ohmic resistance of the measuring line are proportional to the cable resistance of a respective first electrical line via which the converter feeds the electric motor, e.g., that is, so that this line conducts one phase of the motor current.

According to example embodiments, via the first electrical lines, the converter provides the electric motor, e.g., the stator of the electric motor, a three-phase voltage, e.g., a rotary voltage, which causes, e.g., drives, a motor current, and the converter, e.g., the control unit of the converter, sets the motor voltage such that the detected motor current is regulated to a target motor current, e.g., that is specified such that the electric motor attains a target speed or target torque. Thus, the control unit provides for stator-flux oriented control.

According to example embodiments, the converter has an inverter, the inverter has three parallel-switched series circuits supplied from a DC voltage, e.g., intermediate circuit voltage, and each of the series circuits has two controllable semiconductor switches connected in series with one another, for which the control unit generates pulse-width modulated control signals. For example, the central taps of the series circuits form the AC voltage-side connection of the inverter. The voltage on the DC voltage-side connection of the inverter is detected and is provided to the control unit for taking into account when the pulse width modulation ratio of the pulse width modulated control signals are determined.

Thus, when the control signals are generated by the control unit according to a control machine model, e.g., according to a stator flux-oriented control, the cable resistance of the first electrical lines of the cable connecting the converter to the electric motor can be repeatedly updated and thus the control can be carried out in an improved manner. The converter makes available to the electric motor a rotary voltage system, e.g., which drives the motor current as rotary current, via the first electrical lines.

According to example embodiments, the control unit takes the cable resistance into account when determining the pulse width modulated control signals of the inverter. Thus, the control quality is improved, because parameters used during the control process are always updated.

According to example embodiments, a controller is arranged on the first cable end and is supplied from an AC voltage supply network and supplies a brake via the third electrical lines. Thus, the voltage detection is integrated in the converter and, thus, no direct data transmission of the current values to the converter is necessary.

According to example embodiments, a controller is arranged on the first cable end and is supplied from an AC voltage supply network via the third electrical lines and electrically supplies, e.g., and controls, a brake arranged on the electric motor. Thus, the current detection can be determined independently of the current fluctuations of the high current that flows through the first electrical lines.

According to example embodiments, the controller is connected to sensors, and the sensor signals of the sensors are sent to the controller. Thus, the controller also functions to evaluate sensor signals and/or as a data node. This is because values detected by the sensors can be forwarded via the controller to a signals electronics element of the converter or to an industrial system.

According to example embodiments, a data transmission channel is provided between the converter and the controller. For example, using modulation of, e.g., high-frequency voltage or current components on one or a plurality of electrical lines, e.g., on first electrical lines or third electrical lines.

Thus, a data stream can be transmitted via current and voltage components modulated onto these lines, and the components have a higher frequency than the three-phase voltage system provided to the electric motor by the converter.

According to example embodiments, the determined resistance value is multiplied by the ratio, e.g., the quotient, of the line cross-section of the first lines to the line cross-section of the third lines and used by the control unit, e.g., for stator flux-oriented control of the electric motor. Thus, an indirect determination, and thus galvanically separated determination, of the resistance is made possible and a less computationally complex conversion is sufficient for determining the cable resistance of the first electrical lines.

According to example embodiments, the cable is a hybrid cable. For example, the third electrical lines are low current lines and the first lines are high current lines, or the third electrical lines have a smaller line cross-section than the first electrical lines. Thus, it is possible to determine a resistance of the third electrical lines in a manner galvanically separated from the first electrical lines via which the converter supplies the electric motor.

According to example embodiments, the converter is supplied from a or the AC voltage supply network, e.g., rotary network. Thus, the converter can be provided with a three-phase supply and the controller and brake can be supplied from two lines of this three-phase supply. The controller controls or regulates the voltage that is made available to the coil of the brake, and/or the current that is supplied to the coil of the brake.

Further features and aspects of example embodiments of the present invention are described in greater detail below with reference to the appended schematic Figures.

DETAILED DESCRIPTION

Figure 1:
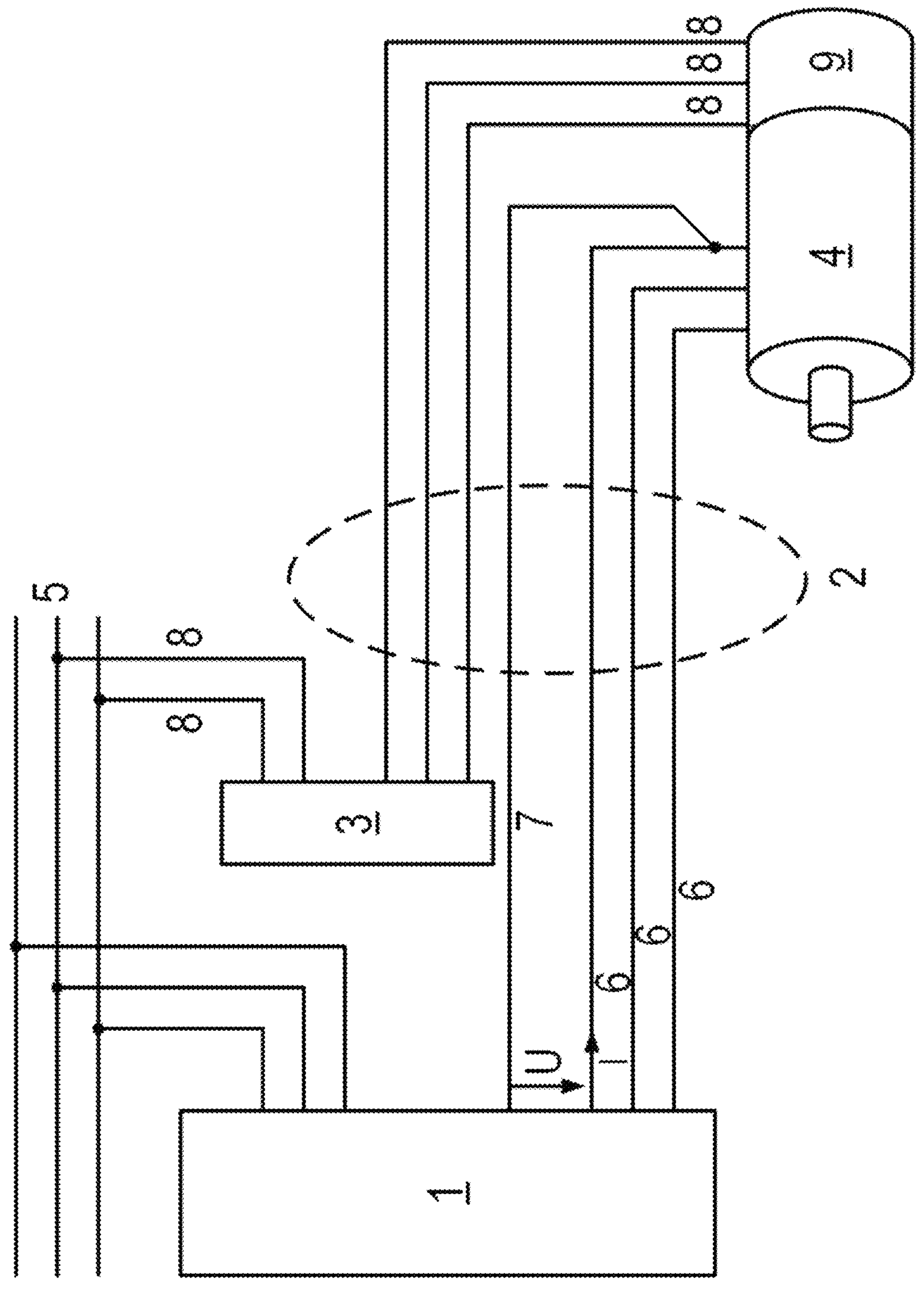
FIG. 1 is a schematic view of a drive system.

As illustrated in FIG. 1, the drive system has a converter that is electrically supplied from an AC supply network 5, e.g., a rotary current network, e.g., with three-phase current.

An electric motor 4, e.g., a rotary current motor, is fed from the converter 1. To this end, first electrical lines 6 are routed from the converter 1 to the electric motor 4.

The first electrical lines 6 are, for example, arranged and/or combined together with a second electrical line 7 and third electrical lines 8 in a hybrid cable 2.

In this manner wiring is fast.

The line cross-section of the first electrical lines is, e.g., larger than the line cross-section of the second electrical line 7 and also larger than the line cross-section of the third electrical lines 8.

The line cross-section of the second electrical line 7 and the third electrical line 8 is, for example, the same.

The converter 1 is, e.g., arranged in a control cabinet of an industrial system or machine and the electric motor 4 in the or in a machine of the system.

As illustrated in FIG. 1, an electromagnetically actuatable brake is added to or integrated into the electric motor 4.

This brake has a coil that can be supplied current and that has a central tap, so that the coil is arranged from a series circuit of a first coil winding and a second coil winding that is, e.g., concentric thereto.

By energizing the first coil winding, it is possible to rapidly build up a magnetic field so that when a predetermined magnetic field strength is achieved, the entire coil can be energized instead of just the first coil winding. This makes it possible to hold the brake in a current-saving manner.

The coil, e.g., the two coil windings arranged concentrically to one another, is received in a depression of a magnet body connected rotation-fast to the stator housing of the electric motor 4.

An annular driver is connected rotation-fast to the rotor shaft of the electric motor, and the driver is fitted onto the rotor shaft and has external teeth.

A disk-shaped brake lining carrier has internal teeth with which the brake lining carrier is fitted onto the external teeth of the driver, so that the internal teeth of the brake lining carrier are engaged with the external teeth of the driver. Thus, although the brake lining carrier is connected rotation-fast to the driver, the brake lining carrier is arranged displaceable axially relative to the driver, that is, in the direction of the rotational axis of the rotor shaft.

The brake lining carrier has brake linings axially on both sides.

A ferromagnetic armature disk is arranged axially between the magnet body and the brake lining carrier. This armature disk is connected rotation-fast to the magnet body, e.g., in that bolts project through recesses in the armature disk and these bolts are inserted into the magnet body and/or are, e.g., securely connected to the magnet body. The bolts are oriented axially.

Spring elements supported on the magnet body press on the armature disk. Thus, these spring elements press the armature disk away from the magnet body towards the brake lining carrier when the coil is not energized, so that the brake lining carrier onto a finely machined brake surface arranged on an end shield of the electric motor or onto a friction plate that is connected rotation-fast to the stator housing.

In contrast, when the coil is energized the armature disk is pulled toward the magnet body against the spring force generated by the spring elements, so that the brake lining carrier is released from the armature disk and the braking force of the brake disappears.

When the coil is energized, only the first coil winding is energized in a first time interval and the second coil winding is then also energized in a time interval subsequent thereto.

The control unit 3 is supplied from, e.g., two phases of the AC supply network 5, e.g., the rotary current network, and controls the current supplied to the brake, e.g., that is, the coil of the brake or the coil windings of the brake. However, the voltage applied to the coil or to the coil windings can, for example, also be detected, e.g., by a voltage detection device of the control unit 3.

For supplying the brake, e.g., that is, the coil of the brake or the coil windings of the brake, with current and/or voltage, the third electrical lines 8 electrically connect the connections of the controller 3 to the connections of the brake, e.g., that is, to the coil of the brake or the coil windings of the brake.

The second electrical line 7 has the same line cross-section as each of the third electrical lines 8.

However, the second electrical line 7 is routed from a connection of the converter 1 to a connection of the electric motor 4, to which a first of the first electrical cables 6 is also routed, e.g., that has a larger line cross-section than the second electrical line 7.

A device for detecting the voltage between the first of the first electrical lines 6 and the second electrical line 7 is arranged in the converter 1, and the value of this detected voltage is forwarded to a signals electronics element of the converter 1 that generates control signals for semiconductor switches of an inverter of the converter 1.

The inverter is, for example, arranged from three series circuits connected in parallel, in which each of the series circuits has two semiconductor switches connected with one another in series. The electric motor 4 is supplied from the central taps of the inverter.

The signals electronics element has a control unit that, for example, carries out a stator-flux oriented control method. The current supplied by the inverter to the electric motor via the first electrical lines 6 is detected, e.g., by a current sensor of the inverter 1, and fed to the control unit.

In addition, the DC voltage supplying the three parallel-connected series circuits of the inverter is detected and also fed to the control unit.

The control unit determines an actual value of a speed and/or a torque of the electric motor 4 from the detected current curve, e.g., taking into account the detected DC voltage.

This actual value is regulated to a target value in that a rotary voltage is made available to the electric motor 4 by the controller 3 using corresponding pulse width-modulated control of the semiconductor switches.

This rotary voltage thus also acts as a control variable of the control unit.

When making this determination, the control unit uses a parameter that represents the cable resistance of the first electrical lines 1. The cable resistance is temperature dependent.

In order to determine this parameter with a high degree of accuracy, the voltage U that occurs between first of the first electrical lines 6 and the second electrical line 7 is detected in the inverter 1 on a recurring basis.

This first of the first electrical lines 6 is electrically connected to the second electrical line 7 at the connection of the electric motor 4. In this manner, it is possible to determine the voltage U that drops on the first of the first electrical line, which occurs when the current flows through it.

The ohmic resistance of this first of the first electrical lines 6 can be determined from the detected voltage drop and the likewise detected current flowing through the first of the first electrical lines 6, and can be used as a cable resistance by the control unit.

In this manner, it is possible to operate the control unit more efficiently. Overall, this also improves the control quality of the control system.

The control unit 3, together with the converter, can be arranged in a control cabinet or, together with or on the converter 1, can be arranged in an industrial system or machine. The electric motor 4, together with the brake 9, is arranged spatially apart therefrom, but, e.g., also in the system or on the machine.

The electrical lines 6, 7, and 8 are routed either individually or, e.g., arranged together in a hybrid cable 2 from the electric motor 4 to the converter 1 with the controller 3.

Figure 2:
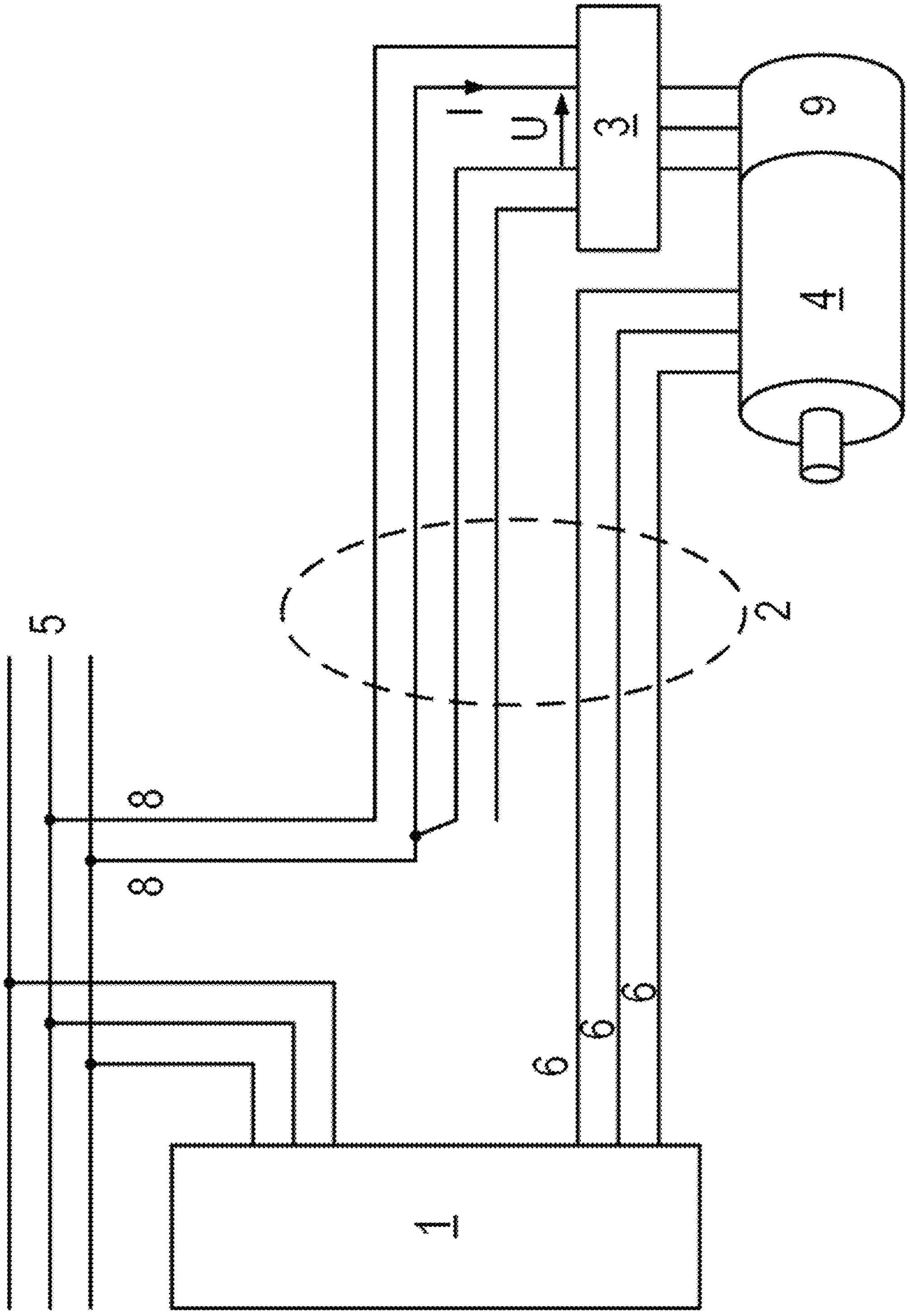
FIG. 2 is a schematic view of a drive system.

As illustrated in FIG. 2, in contrast to FIG. 1, the controller 3 is arranged, together with the brake 9, on the electric motor 4.

Thus, the third electrical lines 8, which supply the controller 3 electrically, together with the second electrical line 7, are in turn arranged individually separately or, e.g., in a hybrid cable 2. However, the voltage U dropping on a first of the three electrical lines 8 is detected by a voltage detection device that is arranged in the controller 3. To this end, the second electrical line 7 is electrically connected on the network side to the first of the third electrical lines 8. The voltage detection device thus detects the voltage U dropping on the motor side on the first of the third electrical lines 8 and determines the ohmic resistance of the first of the third electrical lines 8 from the current flowing through the first of the third electrical lines 8, which is also determined by the controller.

Since the first electrical lines 6, together with the third electrical lines 8, are arranged in the hybrid cable and thus are connected in a heat conducting manner, the temperature of all these lines 6 and 8 is substantially identical. Thus, the ohmic resistance of the respective first electrical line 6 can be determined very precisely from the determined ohmic resistance.

The control unit 3 transmits the detected value to the inverter 1 via a data transmission channel. This data transmission channel is either arranged as a data bus line, which is, e.g., also carried in the hybrid cable, e.g., as a shielded cable, or using higher-frequency modulation, e.g., on the first electrical lines 6. Thus, it is even possible to save further lines.

Due to this indirect but very precise determination, it is also possible to use the cable resistance of the cable routed from the converter 1 to the electric motor 4 as a parameter in the control system. This also improves the control system.

In addition, sensors for determining values of physical variables, e.g., temperature, speed, and torque, are arranged in the electric motor 4 and/or in the brake 9. The sensor signals of the sensors are fed to the controller 3 and evaluated and/or forwarded via the third electrical lines 8 by the controller 3.

Figure 3:
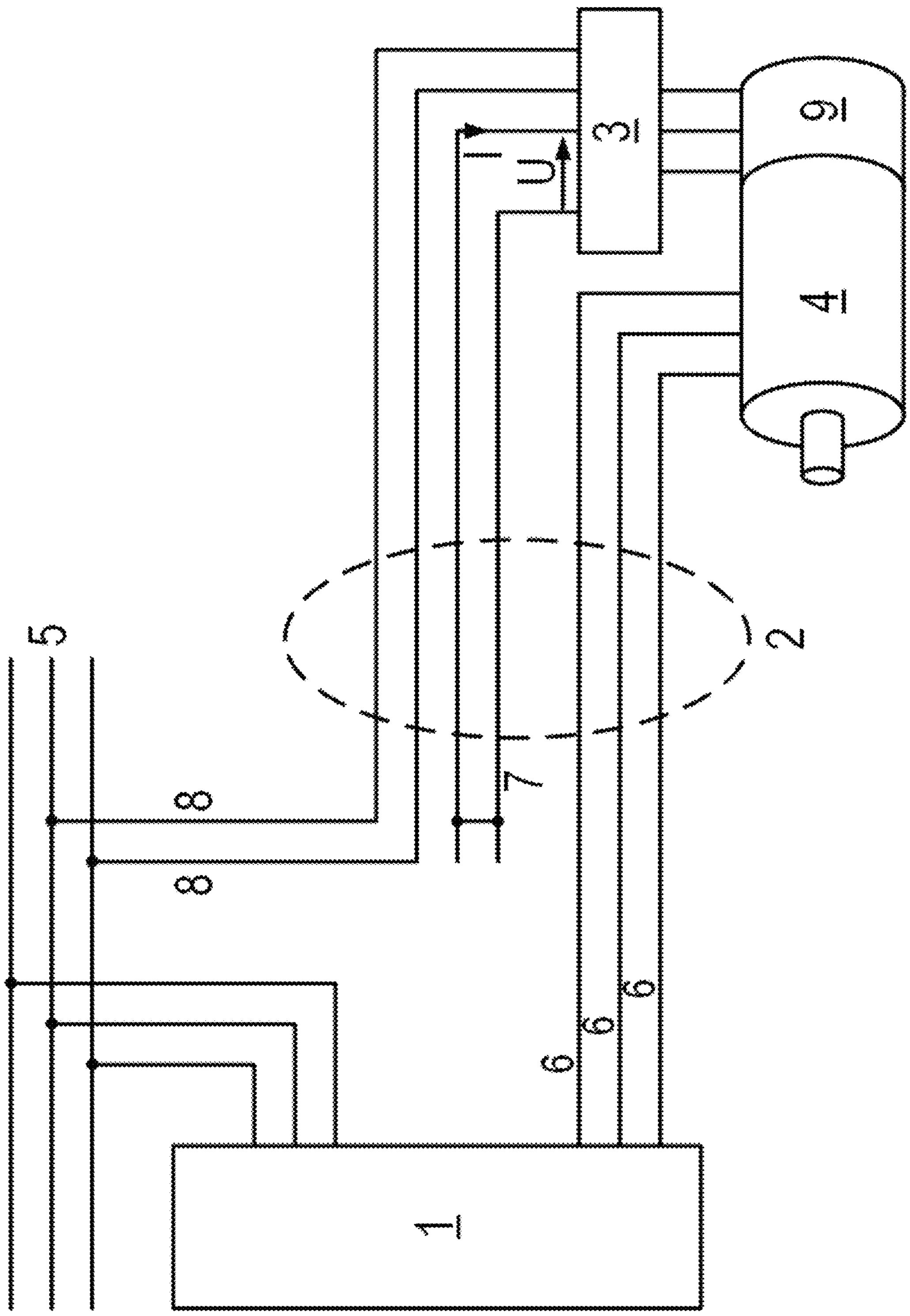
FIG. 3 is a schematic view of a t drive system.

As illustrated in FIG. 3, in contrast to the configuration according to FIG. 2, one of the third electrical lines, which functions as a measuring line, is also present and is connected to the second electrical line 7 at the end of the cable 2 facing away from the controller 3. A voltage U applied by the controller 3 between the two lines, that is, between the second electrical line 7 and the third electrical line functioning as the measuring line, drives a current I through the third electrical line functioning as a measuring line. The ohmic resistance can then be determined from this without interference and galvanically isolated.

In other exemplary embodiments, an electric motor 4 without a brake 9 is used, in contrast to the foregoing. The controller 3 is adapted for evaluating and/or forwarding the sensor signals from sensors that are arranged in the electric motor 4, e.g., for determining values of physical variables, e.g., temperature, speed, and torque.

LIST OF REFERENCE NUMERALS

1 Converter
2 Hybrid cable
3 Controller
4 Electric motor, e.g., rotary current motor
AC supply network, e.g., rotary current network
6 First line
7 Second line
8 Third line
9 Brake

The invention claimed is:

1. A drive system, comprising:
an electric motor;
a converter adapted to feed the electric motor and including a control unit;
a cable electrically connecting the electric motor to the converter and including first electrical lines, a second electrical line, and third electrical lines;
a voltage sensor arranged on a first cable end adapted to detect a voltage present between the second electrical line and a further electrical line corresponding to one of the first electrical lines or one of the third electrical lines, the further electrical line being electrically connected and/or directly electrically connected to the second electrical line on a second cable end; and
a current sensor adapted to detect current flowing through the further electrical line;
wherein the control unit of the converter is adapted to receive a resistance value determined from the detected voltage and the detected current.

2. The drive system according to claim 1, wherein the control unit of the converter is adapted to receive the resistance value for use in a stator flux-oriented control of the electric motor.

3. The drive system according to claim 1, wherein each of the first electrical lines has a same line cross-section, each of the third electrical lines has a same line cross-section, and/or the second electrical line has a same line cross-section as the third electrical lines.

4. The drive system according to claim 1, wherein the first electrical lines, the third electrical lines, and the second electrical line are connected to one another in a heat conducting manner.

5. The drive system according to claim 4, wherein a thermal transfer resistance between the lines is lower than a thermal transfer resistance from one of the lines to the environment.

6. The drive system according to claim 1, wherein the first cable end is arranged on a converter side and the second cable end is arranged on a motor side, and the voltage sensor and the current sensor are arranged in the converter.

7. The drive system according to claim 1, wherein the first cable end is arranged on a motor side and the second cable end is arranged on a converter side, and the voltage sensor and the current sensor are arranged on the electric motor, on a brake of the electric motor, and/or in a controller.

8. The drive system according to claim 1, wherein the first electrical lines, the second electrical line, and the third electrical lines are arranged as copper wires lines.

9. The drive system according to claim 1, wherein, via the first electrical lines, the converter is adapted to provide to the electric motor and/or a stator of the electric motor a three-phase voltage that causes and/or drives a motor current, the converter and/or the control unit of the converter adapted to set a motor voltage such that the detected motor current is regulated to a target motor current.

10. The drive system according to claim 1, wherein a controller is arranged on the first cable end, is adapted to be supplied from an AC voltage supply network, and is adapted to supply a brake via the third electrical lines and/or a controller is arranged on the first cable end, is adapted to be supplied from an AC voltage supply network via the third electrical lines, and is adapted to electrically supply and control a brake arranged on the electric motor.

11. The drive system according to claim 10, wherein the controller is connected to sensors adapted to send sensor signals to the controller.

12. The drive system according to claim 10, wherein a data transmission channel is arranged between the converter and the controller.

13. The drive system according to claim 1, wherein the determined resistance value is multiplied by a ratio and/or a quotient of a line cross-section of the first lines to a line cross-section of the third lines and is used by the control unit.

14. The drive system according to claim 1, wherein the cable is arranged as a hybrid cable.

15. The drive system according to claim 14, wherein the third electrical lines are arranged as low current lines and the first lines are arranged as high current lines and/or wherein the third electrical lines have a smaller line cross-section than the first electrical lines.

16. The drive system according to claim 1, wherein the converter is adapted to be supplied from an AC voltage supply network.

17. A drive system, comprising:

an electric motor;

a converter adapted to feed the electric motor and including a control unit;

a cable electrically connecting the electric motor to the converter and including first electrical lines, a second electrical line, and third electrical lines;

a voltage sensor arranged on a first cable end adapted to detect a voltage present between the second electrical line and a further electrical line corresponding to one of the first electrical lines or one of the third electrical lines, the further electrical line being electrically connected and/or directly electrically connected to the second electrical line on a second cable end; and a current sensor adapted to detect current flowing through the further electrical line;

wherein the control unit of the converter is adapted to receive a resistance value determined from the detected voltage and the detected current; and wherein the converter includes an inverter having three parallel-switched series circuits supplied from a DC voltage, each series circuit including two controllable semiconductor switches connected in series with one another, the control unit adapted to generate pulse-width modulated control signals for the semiconductor switches, a voltage on a DC voltage-side connection of the inverter being detected and provided to the control unit to take into account when a pulse width modulation ratio of the pulse width modulated control signals are determined.

18. The drive system according to claim 17, wherein the control unit is adapted to takes into account a cable resistance during determination of the pulse width modulated control signals of the inverter.

* * * * *